(12) United States Patent
Cun et al.

(10) Patent No.: US 11,441,917 B2
(45) Date of Patent: Sep. 13, 2022

(54) SYSTEM AND METHOD FOR ADJUSTING AN ELECTRIC VEHICLE CHARGING SPEED

(71) Applicant: Honda Motor Co., Ltd., Tokyo (JP)

(72) Inventors: David Wong Cun, Fountain Valley, CA (US); Eri Izumi Maeda, Rancho Palos Verdes, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 478 days.

(21) Appl. No.: 16/665,717

(22) Filed: Oct. 28, 2019

(65) Prior Publication Data

US 2021/0046841 A1   Feb. 18, 2021

Related U.S. Application Data

(60) Provisional application No. 62/886,895, filed on Aug. 14, 2019.

(51) Int. Cl.
*B60L 9/00*         (2019.01)
*G05D 1/00*         (2006.01)
(Continued)

(52) U.S. Cl.
CPC .......... *G01C 21/3476* (2013.01); *B60L 53/11* (2019.02); *B60L 53/305* (2019.02);
(Continued)

(58) Field of Classification Search
CPC ........ B60L 53/11; B60L 53/305; B60L 53/62; B60L 53/64; B60L 53/665; B60L 53/68;
(Continued)

(56) References Cited

U.S. PATENT DOCUMENTS 8,417,401 B2   4/2013  Takahara et al.
8,615,355 B2  12/2013  Inbarajan et al.
(Continued)

FOREIGN PATENT DOCUMENTS

CN   108001282   5/2018
CN   108556661   9/2018
(Continued)

OTHER PUBLICATIONS

Office Action of U.S. Appl. No. 17/095,013 dated Aug. 25, 2021, 36 pages.
(Continued)

*Primary Examiner* — Richard Tan
(74) *Attorney, Agent, or Firm* — Rankin, Hill & Clark LLP

(57) ABSTRACT

A system and method for adjusting an electric vehicle charging speed that include determining that an electric vehicle arrives at a charging station and receiving electric vehicle pricing data associated with a price to charge the electric vehicle at a plurality of charging speed tiers by the charging station. The system and method also include determining a price difference between the price to charge the electric vehicle at a fast charging speed tier and a slower charging speed tier. The system and method further include adjusting the electric vehicle charging speed to the fast charging speed tier upon determining that the price difference is equal to or below a charging price delta threshold.

20 Claims, 6 Drawing Sheets

(51) Int. Cl.
*G05D 3/00* (2006.01)
*G06F 7/00* (2006.01)
*G06F 17/00* (2019.01)
*G01C 21/34* (2006.01)
*B60L 58/12* (2019.01)
*G06F 9/451* (2018.01)
*B60L 53/68* (2019.01)
*B60L 53/10* (2019.01)
*B60L 53/64* (2019.01)
*B60L 53/30* (2019.01)
*B60L 53/66* (2019.01)
*B60L 53/62* (2019.01)

(52) U.S. Cl.
CPC ............... *B60L 53/62* (2019.02); *B60L 53/64* (2019.02); *B60L 53/665* (2019.02); *B60L 53/68* (2019.02); *B60L 58/12* (2019.02); *G06F 9/451* (2018.02); *B60L 2240/60* (2013.01)

(58) Field of Classification Search
CPC ...... B60L 58/12; B60L 2240/60; G06F 9/451; Y02T 90/167; Y02T 10/70; Y02T 10/7072; Y02T 90/12; Y02T 90/14; Y02T 90/16; Y04S 30/12; Y04S 30/14; G01C 21/3476; G01C 21/3469; G01C 21/3484; G01C 21/3617
USPC .......................................................... 701/22
See application file for complete search history.

(56) References Cited

U.S. PATENT DOCUMENTS

| | | | |
|---|---|---|---|
| 8,717,170 B1 | 5/2014 | Juhasz | |
| 8,963,494 B2 | 2/2015 | Kishiyama et al. | |
| 8,965,669 B2 | 2/2015 | Fisher et al. | |
| 9,056,553 B2 | 6/2015 | Cun | |
| 9,112,382 B2 | 8/2015 | Paul et al. | |
| 9,132,746 B2 | 9/2015 | Enomoto et al. | |
| 9,142,978 B2 | 9/2015 | Juhasz | |
| 9,177,306 B2 | 11/2015 | Penilla et al. | |
| 9,379,559 B2 | 6/2016 | O'Connell et al. | |
| 9,448,083 B2 | 9/2016 | Loftus et al. | |
| 9,459,114 B2 | 10/2016 | Saito et al. | |
| 9,545,853 B1 | 1/2017 | Penilla et al. | |
| 9,580,079 B2 | 2/2017 | Long | |
| 9,610,853 B1 | 4/2017 | Miller et al. | |
| 9,685,798 B2 | 6/2017 | Appelbaum et al. | |
| 9,709,988 B2 | 7/2017 | Miller et al. | |
| 9,739,624 B2 | 8/2017 | Rajagopalan et al. | |
| 9,744,871 B2 | 8/2017 | Sabripour | |
| 9,796,280 B2 | 10/2017 | McCool et al. | |
| 9,937,794 B2 | 4/2018 | Bellin et al. | |
| 10,101,397 B2 | 10/2018 | Cooley et al. | |
| 10,168,170 B2 | 1/2019 | North et al. | |
| 10,185,978 B2 | 1/2019 | Khoo et al. | |
| 10,369,974 B2 | 8/2019 | Carlson et al. | |
| 2008/0243330 A1 | 10/2008 | Kato | |
| 2010/0094496 A1 | 4/2010 | Hershkovitz et al. | |
| 2011/0225105 A1 | 9/2011 | Scholer et al. | |
| 2012/0019204 A1 | 1/2012 | Matsuo et al. | |
| 2014/0021908 A1 | 1/2014 | McCool et al. | |
| 2014/0316939 A1 | 10/2014 | Uyeki | |
| 2015/0183333 A1 | 7/2015 | Forbes, Jr. et al. | |
| 2015/0202975 A1 | 7/2015 | Solomon et al. | |
| 2015/0294329 A1 | 10/2015 | Saito et al. | |
| 2016/0264011 A1 | 9/2016 | Yasukawa et al. | |
| 2017/0010116 A1 | 1/2017 | Inoue et al. | |
| 2017/0074671 A1 | 3/2017 | Yoshimura et al. | |
| 2017/0120758 A1 | 5/2017 | Xu et al. | |
| 2017/0168493 A1 | 6/2017 | Miller et al. | |
| 2018/0073882 A1 | 3/2018 | North et al. | |
| 2018/0158150 A1 | 6/2018 | Li et al. | |
| 2018/0340784 A1 | 11/2018 | Upadhyay et al. | |
| 2018/0370379 A1 | 12/2018 | Chen et al. | |
| 2019/0025068 A1 | 1/2019 | Yoshino et al. | |
| 2019/0152335 A1 | 5/2019 | Farber | |
| 2019/0285425 A1 | 9/2019 | Ludwick et al. | |
| 2020/0126123 A1 | 4/2020 | Loriaux | |
| 2020/0198658 A1 | 6/2020 | Suzuki et al. | |
| 2020/0254896 A1 | 8/2020 | Lee et al. | |
| 2020/0376972 A1 | 12/2020 | Martin et al. | |

FOREIGN PATENT DOCUMENTS

| | | |
|---|---|---|
| CN | 109029477 | 12/2018 |
| CN | 106427635 | 3/2019 |
| CN | 109900288 | 6/2019 |
| CN | 109927566 | 6/2019 |
| CN | 106447129 | 8/2019 |
| DE | 102010064015 | 6/2012 |
| DE | 102017006944 | 3/2018 |
| EP | 2676832 | 12/2013 |
| FR | 2971874 | 8/2012 |
| JP | 2010230615 | 10/2010 |
| JP | 2011170686 | 9/2011 |
| JP | 5408002 | 2/2014 |
| JP | 2014106137 | 6/2014 |
| KR | 101845241 | 4/2018 |
| KR | 102046995 | 12/2019 |
| WO | WO2011104883 | 9/2011 |
| WO | WO2019126806 | 6/2019 |

OTHER PUBLICATIONS

Office Action of U.S. Appl. No. 16/593,580 dated Mar. 29, 2022, 41 pages.
Office Action of U.S. Appl. No. 16/654,348 dated Jan. 6, 2022, 49 pages.
Office Action of U.S. Appl. No. 17/095,013 dated Jan. 28, 2022, 35 pages.
Office Action of U.S. Appl. No. 16/654,348 dated May 6, 2022, 42 pages.
Office Action of U.S. Appl. No. 17/095,013 dated May 13, 2022, 44 pages.

| CHARGING SPEED TIER — 514 | CURRENT PRICING SCHEME — 516 | ESTIMATED TIME TO CHARGE TO DESIRED SOC — 518 | STATUS — 520 | SELECT |
|---|---|---|---|---|
| FASTEST TIER 1 | N$ / kWh | 3:40 | AVAILABLE | ⓘ 522 |
| FAST TIER 2 | N$ / kWh | 4:34 | AVAILABLE | ⓘ 524 |
| FAST TIER 3 | N$ / kWh | 5:29 | AVAILABLE | ⓘ 526 |
| FAST TIER 4 | N$ / kWh | 6:01 | CURRENT TIER | ⓘ 528 |
| OPERATOR PREFERRED TIER | N$ / kWh | 6:56 | DEFAULT TIER | ⓘ 530 |
| SLOWER TIER 1 | N$ / kWh | 7:18 | AVAILABLE | ⓘ 532 |
| SLOWER TIER 2 | N$ / kWh | 8:00 | AVAILABLE | ⓘ 534 |

FIG. 5B

SYSTEM AND METHOD FOR ADJUSTING AN ELECTRIC VEHICLE CHARGING SPEED

CROSS-REFERENCE TO RELATED APPLICATION

This application claims priority to U.S. Provisional Application Ser. No. 62/886,895 filed on Aug. 14, 2019, which is expressly incorporated herein by reference.

BACKGROUND

Electric vehicles contain electric storage mechanisms (e.g., electric engines powered by rechargeable batteries) to store electricity and power electric vehicles. The electric storage mechanisms may be replenished periodically by using, for example, charging equipment installed at charging stations. Operators of electric vehicles may be typically concerned about balancing charging efficiency and costs. In many cases, when operators connect their electric vehicles to charge, the electric vehicles may charge to a particular state of charge at one or more charging speeds (e.g., 100% state of charge of the rechargeable batteries) regardless of the cost of energy during the charging session. However, in many cases operators of electric vehicles do not realize time savings and/or cost savings that may be attributed to utilizing various charging speed levels that may be provided at various price points. Accordingly, such operators may unnecessarily utilize more time and/or more money for a selected charging speed to charge their electric vehicles without understanding additional charging speeds that may available to them at one or more price points.

BRIEF DESCRIPTION

According to one aspect, a computer-implemented method for adjusting an electric vehicle charging speed that includes determining that the electric vehicle arrives at a charging station and receiving electric vehicle pricing data associated with a price to charge the electric vehicle at a plurality of charging speed tiers by the charging station. The computer-implemented method also includes determining a price difference between a price to charge the electric vehicle at a fast charging speed tier and a slower charging speed tier. The charging speed to charge the electric vehicle is faster when utilizing the fast charging speed tier than when utilizing the slower charging speed tier. The computer-implemented method further includes adjusting the electric vehicle charging speed to the fast charging speed tier upon determining that the price difference is equal to or below a charging price delta threshold.

According to another aspect, a system for adjusting an electric vehicle charging speed that includes a memory storing instructions when executed by a processor cause the processor to determine that an electric vehicle arrives at a charging station and receive electric vehicle pricing data associated with a price to charge the electric vehicle at a plurality of charging speed tiers by the charging station. The instructions also cause the processor to determine a price difference between the price to charge the electric vehicle at a fast charging speed tier and a slower charging speed tier. The charging speed to charge the electric vehicle is faster when utilizing the fast charging speed tier than when utilizing the slower charging speed tier. The instructions further cause the processor to adjust the electric vehicle charging speed to the fast charging speed tier upon determining that the price difference is equal to or below a charging price delta threshold.

According to yet another aspect, a non-transitory computer readable storage medium storing instructions that when executed by a computer, which includes a processor perform a method, the method includes determining that the electric vehicle arrives at a charging station and receiving electric vehicle pricing data associated with a price to charge the electric vehicle at a plurality of charging speed tiers by the charging station. The method also includes determining a price difference between a price to charge the electric vehicle at a fast charging speed tier and a slower charging speed tier. The charging speed to charge the electric vehicle is faster when utilizing the fast charging speed tier than when utilizing the slower charging speed tier. The method further includes adjusting the electric vehicle charging speed to the fast charging speed tier upon determining that the price difference is equal to or below a charging price delta threshold.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 5B is an illustrated example of a pricing scheme user interface that is presented by the smart charge application according to an exemplary embodiment of the present disclosure;

DETAILED DESCRIPTION

Figure 1:
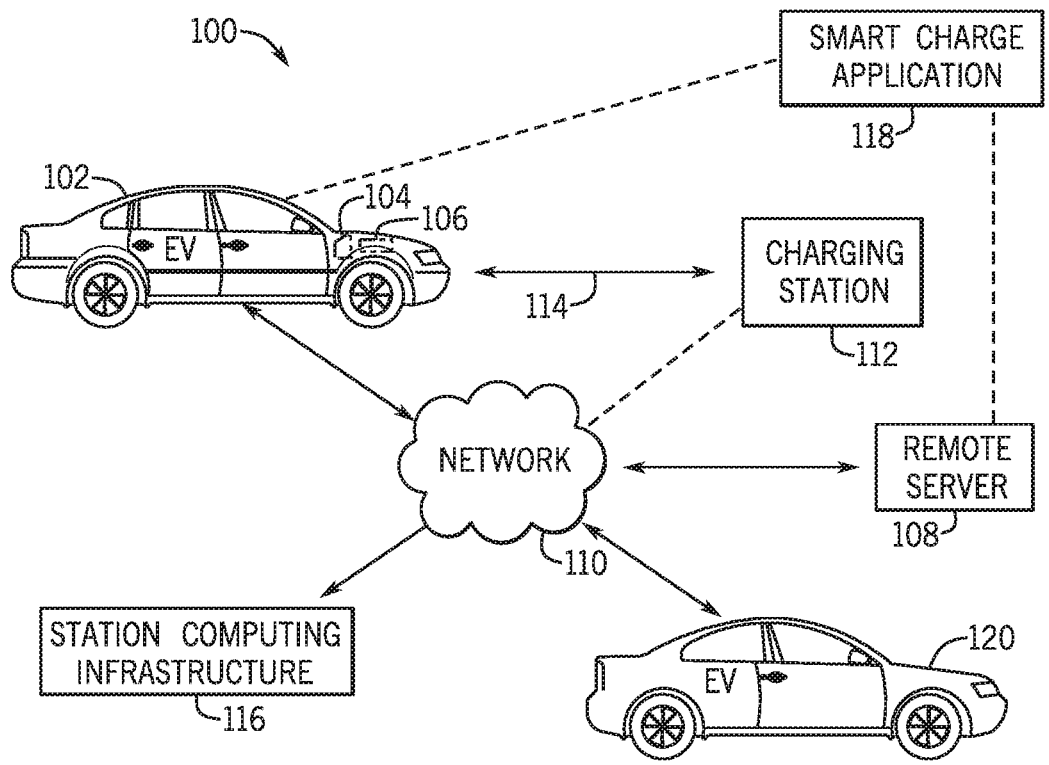
FIG. 1 is a high-level schematic view of an illustrative system for adjusting an electric vehicle charging power according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview:

Referring now to the drawings, wherein the showings are for purposes of illustrating one or more exemplary embodiments and not for purposes of limiting same, FIG. 1 is a high-level schematic view of an illustrative system 100 for adjusting an electric vehicle charging power according to an exemplary embodiment of the present disclosure. The components of the system 100, as well as the components of other systems and architectures discussed herein, may be combined, omitted or organized into different architectures for various embodiments.

In the exemplary embodiment of FIG. 1, the system 100 includes an electric vehicle (EV) 102 that is powered by an electric motor 104 and an electric storage mechanism, for example, a battery 106. In one embodiment, the EV 102 is purely electric in that it only includes the electric motor 104. In other embodiments, the EV 102 may include the electric motor 104 and an internal combustion engine (not shown). In some embodiments, the EV 102 may have any number of electric motors, batteries, and/or internal combustion engines that may operate in a series (e.g., as in an extended range electric vehicle), in parallel, or some combination of series and parallel operation.

The EV 102 may be operably connected for computer communication to a remote server 108 via a wireless communication network 110. The EV 102 may transmit and receive data (e.g., state of charge data, energy cost data, charging commands/signals) to and from the remote server 108, and vice versa, through the network 110. The remote server 108 may be a remote computing system or a device remote (e.g., off-board) from the EV 102. The system architectures of the EV 102 and the remote server 108 will be discussed in more detail herein with reference to FIG. 2 and FIG. 3.

In the exemplary embodiment of FIG. 1, the system 100 may include one or more charging stations 112 that may connect to the EV 102 via a (respective) charging link 114. The charging station(s) 112 may include electric vehicle supply equipment (EVSE chargers) (not shown) that may connect to the EV 102 via the (respective) charging link 114 to replenish the battery 106 of the EV 102 with charging power. The charging station(s) 112 may also connect to additional electric vehicles 120 via the respective charging link 114 (e.g., from each EVSE charger) to replenish the respective batteries of the additional electric vehicles 120 with charging power.

Additionally, in some embodiments, the charging station(s) 112 may be operably connected for computer communication with the EV 102, the additional electric vehicles 120, and/or the remote server 108, for example, to transmit and receive data (e.g., charge parameters, charging data and feedback, vehicle system data) to and from the EV 102, the additional electric vehicles 120, and/or the remote server 108. The charging link 114 may be a wired or wireless link to the charging station(s) 112. Computer communication may occur also via the charging link 114 and/or a wired or wireless communication link. In one embodiment, the EV 102, the additional electric vehicles 120, the charging station(s) 112, and/or the charging link 114 may be operably controlled to initiate or terminate charging of the EV 102 from the charging station(s) 112 based on one or more charging schedules that are implemented within the system 100.

In one or more embodiments, the charging station(s) 112 may include charging equipment that may be installed at a residential home or outside a residential home, for example, at a public (e.g., non-networked) or private (e.g., networked) charging station(s). The charging station(s) 112 may include a charging station identification designation (e.g., identification number, serial number, alpha-numeric code, station name) that may be used to identify particular charging stations 112. The charging station(s) 112 may replenish the battery 106 using a charging energy source type that indicates the type of energy the charging station(s) 112 provides. Energy may include clean renewable energy and non-renewable energy. Clean renewable energy may include, solar energy, hydro energy, biomass energy, wind energy, among others. Non-renewable energy may include electricity from a grid source supplied by one or more utility providers, and in the case of hybrid vehicles, fossil fuels.

In one or more configurations, the battery 106 of the EV 102 may be configured of being capable of being fast charged based on fast charging components (not shown) that may be operably connected to the battery 106 and/or that may be included as part of the battery 106. Fast charging may enable the EV 102 to be charged at one or more charging speed tiers that provide a higher charging power (e.g., voltage) than a default charging speed tier or a slower charging speed tier. In some cases, the charging station(s) 112 may include fast charging electric charging equipment (not shown) that may be facilitate the charging of the battery 106 of the EV 102 at the one or more charging speed tiers.

In particular, the charging station(s) 112 may provide one or more charging speed tiers that provide a default charging speed (e.g., where a default amount of charging power is provided to charge the EV 102 at a default charging speed) and/or one or more levels of fast charging speeds at one or more charging voltages. For example, one or more fast charging speed tiers may provide one or more levels of fast charging from a default charging speed tier or one or more slower charging speed tiers that may provide slower charging at one or more lower charging voltages (e.g., increase from 240 volts to 480 volts) to more quickly charge the battery 106 of the EV 102 to a particular desired state of charge level (SOC). Accordingly, during utilization of one or more fast charging speed tiers, the battery 106 of the EV 102 may be more quickly charged to a desired SOC than during the utilization of one or more slower charging speed tiers or the default charging speed tier.

One or more charging station entities (e.g., charging station corporate owner/operator) that may include utility providers, fuel providers, and/or entities that own and/or operate one or more various types of charging stations, fuel stations, energy stations, and the like and/or one or more charging stations 112 may thereby provide respective pricing schemes that may pertain to the utilization of one or more respective charging speed tiers. Accordingly, each charging speed tier from a default charging speed tier to one or more fast charging speed tiers may be associated with a respective pricing schemes. As discussed below, the pricing schemes that may be associated with one or more charging speed tiers may be dynamically determined based on one or more factors.

In an exemplary embodiment, the EV 102, the charging station(s) 112, additional electric vehicles 120, and/or the remote server 108 may receive and transmit data through the network 110 to a charging station computing infrastructure 116 (station computing infrastructure). The station computing infrastructure 116 may include one or more computing devices (not shown) that may communicate with one or more charging station entities.

In one embodiment, the station computing infrastructure 116 may receive perspective and/or real-time price data that may be provided by each respective charging station(s) 112 to communicate pricing schemes that may be implemented by one or more respective charging stations 112 and that may be associated with one or more charging speed tiers that may be dynamically determined based on one or more pricing factors. The perspective and/or real-time price data may include charging rates that may be charged during a certain period of time (e.g., hourly, daily, weekly), charging rates that may be based on a customer rating that may be applied to an operator of the EV 102, and/or charging rates that may be applied to an operator of the EV 102 based on one or more incentives, discounts, and/or credits that may be provided, as discussed below.

In some embodiments, the station computing infrastructure 116 may determine each pricing scheme as a price per kilowatt-hour of energy value (price per kWh) that may be communicated to the EV 102, the additional electric vehicles 120, the remote server 108, and/or the charging station(s) 112 based on utility rates that are received from the one or more energy providers, a time of day that charging of the EV 102 may occur, the location of the charging station(s) 112, the demand of electric vehicle charging at a particular timeframe or location, and the like. The price per kWh may include a dynamic value that may change over time based on one or more pricing factors that may include, but may not be limited to, a time of day, a season, a region, a time zone, etc. For example, each hour of a particular day may include a different price per kWh based on one or more pricing schemes that are implemented by the one or more energy providers.

In an exemplary embodiment, the system 100 may include a smart charge application 118 that may be executed to operably control adjustment of a charging speed by the charging station(s) 112 based on the provision of one or more charging speed tiers that may be implemented based on one or more factors, as discussed below. In one embodiment, the smart charge application 118 may be configured to determine one or more pricing schemes that may be associated with one or more respective charging speed tiers. In one configuration, the smart charge application 118 may be configured to communicate with the station computing infrastructure 116 to receive the one or more pricing schemes that may be associated with one or more charging speed tiers for a respective charging station(s) 112 that is being utilized by the EV 102. In another configuration, the smart charge application 118 may be configured to communicate with the remote server 108 to receive the one or more pricing schemes that may be associated with one or more charging speed tiers for a respective charging station(s) 112 that is being utilized by the EV 102. As discussed below, the smart charge application 118 may provide various functions to allow the adjustment of charging speed and consequently charging power by the charging station(s) 112 to charge the battery 106 of the EV 102 at one or more charging speed tiers. More specific aspects of the smart charge application 118 will be discussed in more detail below.

Figure 2:
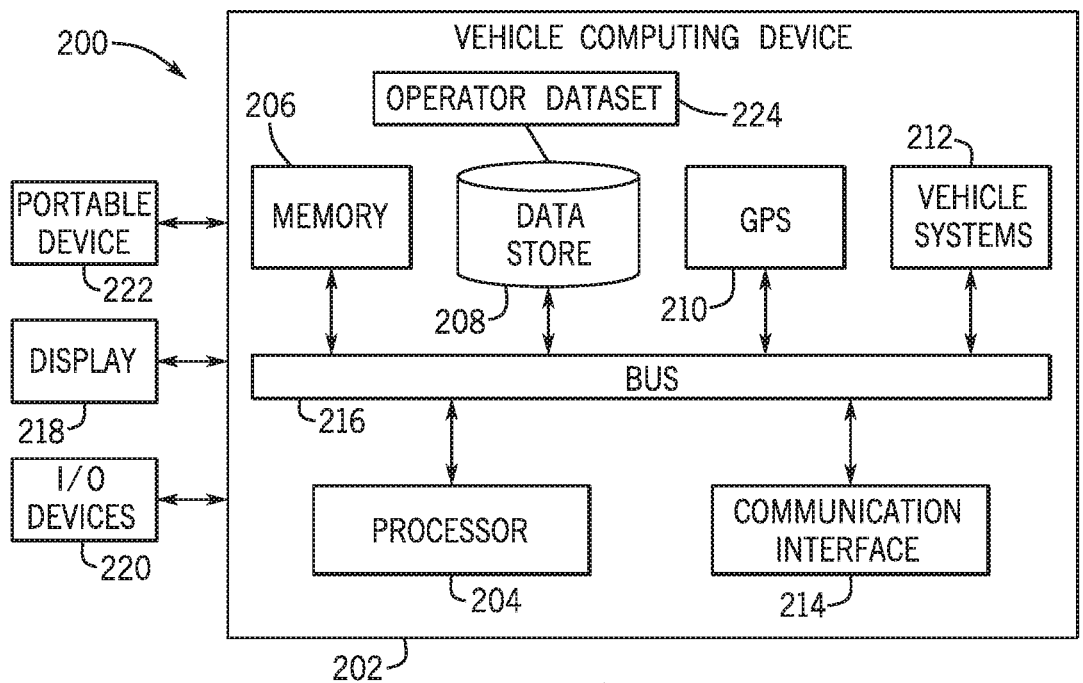
FIG. 2 is a schematic view of an illustrative electric vehicle architecture according to an exemplary embodiment of the present disclosure.

Referring now to FIG. 2, a schematic view of an illustrative electric vehicle architecture 200, for example the EV 102 of FIG. 1, is shown according to an exemplary embodiment. In particular, the EV 102 may include a vehicle computing device 202 (e.g., a telematics unit, an electronic control unit) with provisions for processing, communicating and interacting with various components of the EV 102 and other components of the system 100. The vehicle computing device 202 may include a processor 204, a memory 206, a data store 208, a position determination device 210 (GPS), a plurality of vehicle systems 212 (e.g., including the electric motor 104, the battery 106) and a communication interface 214. The components of the architecture 200, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the EV 102 may include other components and systems not shown.

The data store 208 may be configured to store data files associated with one or more applications, operating systems, vehicle systems, subsystem user interfaces, including but not limited to data files of the smart charge application 118. In one embodiment, the data store 208 of the EV 102 may include an operator dataset 224 that may be utilized to store data associated with the operator of the EV 102 (e.g., name, address, phone number) and data associated with one or more payment accounts utilized by the operator of the EV 102. In some embodiments, the one or more payment accounts may be utilized by the smart charge application 118 to provide payment from the operator of the EV 102 to one or more charging stations 112. In additional embodiments, the one or more payment accounts may be utilized by the smart charge application 118 to provide payment from the operator of the EV 102 to operators of one or more additional electric vehicles 120 to facilitate faster charging, as discussed below. The one or more payment accounts may also be utilized by the smart charge application 118 to provide payment from the operators of one or more additional electric vehicles 120 to the operator of the EV 102 to facilitate faster charging, also as discussed below.

With continued reference to FIG. 2, the communication interface 214 of the EV 102 may provide software, firmware and/or hardware to facilitate data input and output between the components of the vehicle computing device 202 and other components, networks and data sources. Further, the communication interface 214 may facilitate communication with a display 218 (e.g., head unit display, head up display, dash board display) in the EV 102 and other input/output devices 220, for example, a portable device 222 (e.g., key fob, smart phone) connected to the EV 102 that may be used by the operator of the EV 102.

In some embodiments the portable device 222 may include some or all of the components and functionality of the vehicle computing device 202. Additionally, the communication interface 214 may facilitate communication between the EV 102 and the portable device 222 that may include the display and/or input/output devices that may be used to operate various functions of the EV 102 and/or the smart charge application 118. In one embodiment, the display 218 of the EV 102 and/or the portable device 222 (e.g., through a display screen of the portable device 222) may be utilized to provide one or more user interfaces that may be included as a human machine interface(s) of the smart charge application 118.

Figure 3:
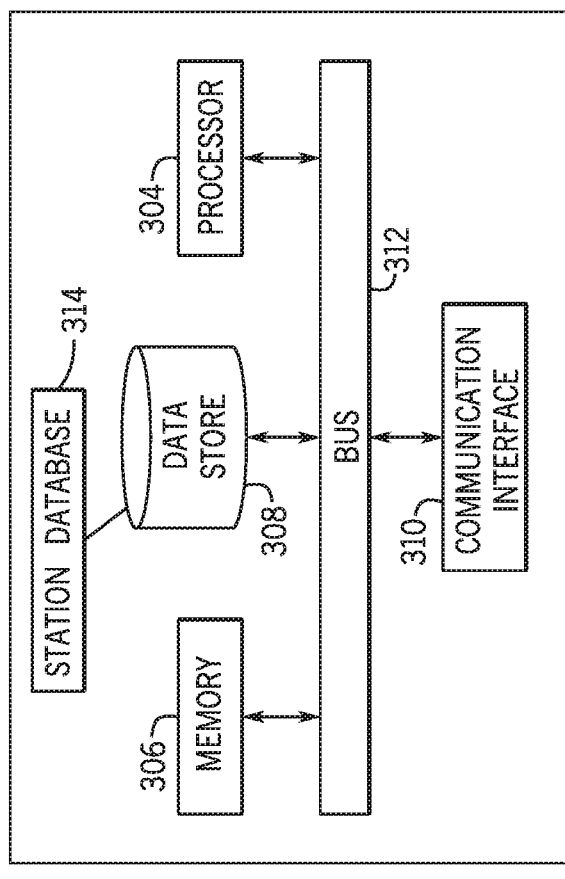
FIG. 3 is a schematic view of an illustrative remote server architecture according to an exemplary embodiment of the present disclosure.

Referring now to FIG. 3, a schematic view of an illustrative remote server architecture 300, for example the remote server 108 of FIG. 1, is shown according to an exemplary embodiment. The remote server 108, is located remotely (i.e., off-board) from the EV 102 (as shown in FIG. 1). In some embodiments, the remote server 108 may be maintained by one or more charging station entities, an Original Equipment Manufacturer (OEM) (e.g., manufacturer of the EV 102), a utility provider, a regulatory body, among others. In additional embodiments, the remote server 108 may be another type of remote device or supported by a cloud architecture.

In FIG. 3, the remote server 108 may include a computing device 302 that may further include a processor 304, a memory 306, a data store 308 and a communication interface 310. The components of the architecture 300, including the computing device 302, may be operably connected for computer communication via a bus 312 and/or other wired and wireless technologies. The computing device 302 as well as the remote server 108 may include other components and systems not shown.

The data store 308 may be configured to store data files associated with one or more applications, operating systems, vehicle systems, subsystem user interfaces, including but not limited to data files of the smart charge application 118. In one configuration, the data store 308 of the remote server 108 may include a station database 314 that may include respective records of charging stations 112 that may be owned and/or operated by one or more charging station entities. The station database 314 may include records that each pertain to particular charging stations 112 that include data that may be pre-updated and/or updated in real-time by one or more charging station entities.

In one configuration, the station database 314 may include records that may pertain to particular charging stations 112 and their respective geo-locations (GPS/DGPS coordinates of the charging station(s) 112). Additionally, the station database 314 may include one or more price schemes that may be implemented by one or more particular charging stations 112 and that are associated with one or more charging speed tiers. Each record may be identified based on the charging station identification designation (e.g., identification number, serial number, alpha-numeric code, station name) that may be used to identify one or more respective charging stations 112.

In one or more embodiments, each of the records of the station database 314 that may be associated with each charging station 112 may also include a reservation queue list associated with the respective charging station 112. The reservation queue list may pertain to the particular charging station 112 and current utilization of the particular charging station 112. In particular, the reservation queue list associated with each charging station 112 may include a reservation queue that includes a listing of one or more electric vehicles that may be added to a queue to utilize the respective charging station 112 to charge respective vehicles (e.g., in order of the queue). The smart charge application 118 may be configured to analyze record(s) associated with one or more charging stations 112 to determine a current queue list and a current utilization of the particular charging station(s) 112 that may pertain to wait times that may be applicable with respect to the charging of the EV 102.

With continued reference to FIG. 3, in one configuration, the communication interface 310 of the computing device 302 may provide software, firmware and/or hardware to facilitate data input and output between the components of the computing device 302 and other components, networks and data sources. In some embodiments, the communication interface 310 may be used to communicate with the EV 102, the charging station(s) 112, the portable device 222, additional electric vehicles 120, and/or other components of system 100 and architecture 200.

II. The Smart Charge Application and Related Methods

The smart charge application 118 and its components will now be discussed in more detail according to an exemplary embodiment and with continued reference to FIGS. 1-3. In one or more embodiments, the smart charge application 118 may be executed by the vehicle computing device 202 of the EV 102 and/or the computing device 302 of the remote server 108. In an alternate embodiment, the smart charge application 118 may be executed by a processor (not shown) of the portable device 222 that may be used by the operator of the EV 102. In one or more configurations, data may be sent or received from the smart charge application 118 to the components of the EV 102, the remote server 108, the charging station(s) 112, the charging link 114, and/or the portable device 222.

In an exemplary embodiment, the smart charge application 118 may include one or more user input interfaces and/or input means (e.g., buttons) that may be presented via the display 218, presented via the portable device 222, and/or included within the EV 102 and/or on the portable device 222. In one embodiment, the one or more user input interfaces and/or input means may include user interface inputs that may be utilized by the operator of the EV 102 to enable or disable the presentation of one or more user interface graphics that may be presented by the smart charge application 118. Additionally, the one or more user input interfaces and/or input means may include user interface inputs that may be utilized by an individual to enable or disable one or more smart charging functions provided by the smart charge application 118.

In one or more embodiments, the smart charge application 118 may be configured to allow the operator of the EV 102 to activate or deactivate an automatic charging speed adjustment mode that may allow the smart charge application 118 to automatically adjust the charging speed tier to charge the battery 106 of the EV 102 at one or more charging stations 112. The smart charge application 118 may also be configured to allow the operator of the EV 102 to activate or deactivate a tier structure pricing mode that may enable the application 118 to present a pricing scheme user interface through the display 218 of the EV 102 or the portable device 222 used by the operator.

In one configuration, the pricing scheme user interface may allow the operator of the EV 102 to select a desired SOC to charge the battery 106. The desired SOC may be provided as a percentage value (e.g., 10% SOC, 60% SOC, 100% SOC). The pricing scheme user interface may also be presented with one or more pricing schemes that may be charged by one or more charging stations 112 and are associated with one or more one or more charging speed tiers. For example, the pricing scheme user interface may be presented through the display 218 of the EV 102 to present one or more pricing schemes that are associated with one or more charging speed tiers and that may be charged by one or more charging stations 112 that are within a predetermined distance (e.g., 5 miles) of a current geo-location of the EV 102. In some configurations, the pricing scheme user interface may also be presented with an estimated time to charge the EV 102 to the desired SOC that may be specifically associated with one or more charging speed tiers. Accordingly, the operator of the EV 102 may utilize such information to determine which charging station(s) 112 to utilize to charge the EV 102 and/or a particular charging speed tier that may be most suitable to charge the EV 102 at a particular charging station 112 and at a particular point in time based on the associated pricing scheme, the estimated time to charge the battery of the EV 102 to the desired SOC, and/or additional factors (e.g., wait time to charge the EV 102).

In one embodiment, the smart charge application 118 may be configured to communicate with the GPS 210 of the EV 102 to determine the current geo-location of the EV 102. The smart charge application 118 may be configured to determine when the EV 102 has arrived at a particular charging station(s) 112 based on a comparison of the current geo-location of the EV 102 and the geo-locations of one or more charging stations 112 as stored on the station database 314 of the remote server 108. In other words, if the current geo-location of the EV 102, as communicated by the GPS 210, matches with a geo-location of a particular charging station 112, the smart charge application 118 may determine that the EV 102 has arrived at the particular charging station 112. In another embodiment, the smart charge application 118 may determine that the EV 102 has arrived at the particular charging station 112 based on a connection to the particular charging station through the charging link 114.

Upon determining that the EV 102 has arrived at the particular charging station 112 and/or that the operator of the EV 102 is intending to charge the battery 106 of the EV 102 based on accessing a connector (not shown) of the charging link 114, the smart charge application 118 may be configured to present the pricing scheme user interface through the display 218 and/or through the portable device 222 used by the operator that may indicate the one or more pricing schemes that are associated with one or more charging speed tiers that may be charged by the particular charging station 112. In one or more embodiments, the pricing scheme user interface may be configured to present an expected time to charge the battery 106 of the EV 102 to a desired SOC at one or more respective charging speed tiers to allow the operator to evaluate which slower charging speed tier to utilize. The operator may thereby utilize the pricing scheme user interface to select a particular charging speed tier to utilize to complete charging of the EV 102.

In some configurations, the pricing scheme user interface may allow the operator to select (e.g., input) the charging speed tier and/or respective pricing scheme to charge the battery 106 of the EV 102 to a desired SOC. Upon receiving the operator's selection to charge the battery 106 of the EV 102 to a SOC (e.g., charge to 80% SOC), the smart charge application 118 may communicate respective data pertaining to the operator's selection of the charging speed tier and/or the respective pricing scheme to the processor 204 of the vehicle computing device 202 of the EV 102 and/or the processor 304 of the computing device 302 of the remote server 108. In some configurations, the smart charge application 118 may communicate respective data pertaining to the operator's selection of the charging speed tier and/or the respective pricing scheme directly to a computing system microprocessor (not shown) of the particular charging station 112. Upon receipt of the respective data, the particular charging station 112 may enable the charging of the EV 102 by providing an amount of charging power that is associated with the selected charging speed tier. The particular charging station 112 may also utilize the associated pricing scheme to charge the battery 106 of the EV 102 to the selected SOC.

In one embodiment, the smart charge application 118 may be configured to present a reservation user interface to the operator of the EV 102 through the display 218 and/or the portable device 222. The reservation user interface may be configured to present a number of electric vehicles that may be included within the reservation queue(s) associated with one or more charging stations 112. Additionally, the reservation user interface may be configured to present the current utilization of the particular charging station(s) 112 that may pertain to wait times that may be applicable with respect to the charging of the EV 102 and/or one or more additional electric vehicles 120.

The reservation user interface may be utilized by the operator of the EV 102 to add the EV 102 to the reservation queue included within one or more records of the station database 314. Accordingly, the EV 102 and/or one or more additional electric vehicles (not shown) may be added to one or more respective reservation queues stored on records associated with one or more respective charging stations 112 on the station database 314 to charge the EV 102 based on the order of the reservation queue. In some configurations, the charging station(s) 112 may maintain numerous reservation queues that may be respectively associated with respective EVSE chargers that may be located at the charging station(s) 112.

In one embodiment, with respect to one or more pricing schemes that may be implemented by one or more charging stations 112, the smart charge application 118 may allow an operator(s) of additional electric vehicle(s) 120 that would like to be added to the respective reservation queue(s) included within the respective record(s) of the station database 314 to more quickly move up in the queue (e.g., without having to wait as long to be moved up). In particular, the smart charge application 118 may present a queue compensation user interface through a display(s) of the additional electric vehicles 120 and/or through a portable device(s) used by respective operators of the additional electric vehicles to request to be expeditiously moved up in the queue in to charge their respective electric vehicle in a shorter period of time (e.g., with less of a wait time to utilize the charging station(s) 112).

In particular, the queue compensation user interface presented by the smart charge application 118 may enable the respective operator(s) of one or more additional electric vehicles 120 to provide a compensation offer (e.g., monetary value offer) to the operator of the EV 102 who may be in the process of charging the EV 102 at a slower charging speed tier at the respective charging station 112. The compensation offer may be presented through a respective queue compensation user interface that may be presented by the smart charge application 118 through the display 218 of the EV 102 and/or the portable device 222 used by the operator of the EV 102. In particular, the compensation offer may be set by the operator(s) of the additional electric vehicle(s) 120 to compensate the operator of the EV 102 who maybe charging the EV 102 at a slower charging speed tier or a default charging speed tier to thereby change charging of the EV 102 to a faster charging speed tier. This change may result in the ability for one or more additional electric vehicles 120 in the queue to be up moved up quickly as the respective charging station 112 may be more quickly utilized to charge the battery 106 of the EV 102 at the faster charging speed tier.

The queue compensation user interface may allow the operator of the EV 102 to accept the compensation offer, deny the compensation offer, and/or provide a compensation counter-offer that may be presented to the operator(s) of the additional electric vehicle(s) 120 to thereby accept or reject. In one embodiment, if the operator of the EV 102 accepts the compensation offer, the smart charge application 118 may communicate with the microprocessor of the respective charging station 112 to thereby adjust the electric vehicle charging power to thereby put the EV 102 in a selected faster charging speed tier. Accordingly, the operator of the EV 102 may be charged based on a pricing scheme that may be associated with the faster charging speed tier. The smart charge application 118 may thereby allow the transfer of the compensation value from the operator(s) of the additional electric vehicle(s) 120 to the operator of the EV 102 based on crediting of one or more payment accounts stored within the operator dataset 224.

As an illustrative example, if the operator of the EV 102 decides to charge the EV 102 at a default charging power tier that may be associated with a default pricing scheme and a slower time to charge the battery 106 of the EV 102 than if the EV 102 was being charged at a fast charging speed tier, the operator(s) of the additional electric vehicle(s) 120 may be able to utilize the queue compensation user interface to present a compensation offer to the operator of the EV 102. The compensation offer may include a monetary offer that may be offered to motivate the operator of the EV 102 to adjust the charging power tier to a requested fast charging power tier (e.g., maximum fast charging power tier) that may be associated with a higher pricing scheme and a faster time to charge the battery 106 of the EV 102 to a desired SOC. Accordingly, the queue compensation user interface may be presented to the operator of the EV 102 through the display 218 and/or the portable device 222 to be accepted, declined, and/or to be countered.

If the operator of the EV 102 accepts the compensation offer, the smart charge application 118 may be configured to adjust the charging power level at the respective charging station 112 to charge the battery 106 of the EV 102 at a requested fast charging power tier that may be associated with a higher pricing scheme and a faster time to charge. Accordingly, the additional electric vehicle(s) 120 may be more quickly moved up within the reservation queue and charged within a shorter period of time as the wait time to utilize the respective charging station 112 to charge the EV 102 (ahead of the additional electric vehicle 120 within the queue) may be shortened based on the faster time to charge the battery 106 of the EV 102. The smart charge application 118 may further facilitate the payment of the compensation from the operator(s) of the additional electric vehicle(s) 120 to the operator of the EV 102 by crediting the one or more payment accounts associated with the operator of the EV 102 that are stored within the operator dataset 224.

In another embodiment, the queue compensation user interface presented by the smart charge application 118 may enable the operator of the EV 102 to provide a compensation offer to the respective operator(s) of one or more additional electric vehicles 120 who may be in the process of charging the additional electric vehicle(s) 120 at a slower charging speed at the respective charging station 112. The compensation offer may be presented through the respective queue compensation user interface that may be presented by the smart charge application 118 through a display (not shown) of the additional electric vehicle(s) 120 and/or a portable device(s) (not shown) used by the operator(s) of the additional electric vehicle(s) 120. In particular, the compensation value may be set by the operator of the EV 102 to compensate the operator(s) of the additional electric vehicle(s) 120 who maybe charging the EV 102 at a slower charging speed tier to thereby change charging of the additional electric vehicle(s) 120 to a fast charging speed tier to thereby charge the additional electric vehicle(s) 120 at a faster charging speed. This change may result in the ability for the EV 102 in the queue to be up more quickly as the respective charging station 112 may be utilized more quickly to charge the additional electric vehicle(s) 120.

In an exemplary embodiment, the smart charge application 118 may allow the operator of the EV 102 to create pre-set preferences with respect to one or more operator preferred charging speed tiers and/or one or more pricing schemes that may pertain to the automatic charging speed selections at one or more charging stations 112 that are implementing the pricing scheme(s). Such pre-set preferences that pertain to one or more operator preferred charging speed tiers and/or one or more pricing schemes may be stored upon the upon the operator dataset 224 and/or one or more records of the station database 314.

In one configuration, the smart charge application 118 may enable the operator of the EV 102 to apply a pre-set preference that may allow the charging station(s) 112 to charge the EV 102 for an amount of time the EV 102 is charged at the one or more operator preferred charging speed tiers and may increase the charging speed to a fast charging speed tier that may be one or more tiers above the one or more operator preferred charging speed tiers if the one or more operator preferred charging speed tiers does not include a fastest charging speed tier. In one embodiment, the faster charging speed tier may be implemented in place of the one or more operator preferred charging speed tiers if the difference in the cost to charge the battery 106 of the EV 102 to a desired SOC between the one or more operator preferred charging speed tiers and the faster charging speed tier that may be one or more tiers above the one or more operator preferred charging speed tiers is equal to or below a charging price delta threshold that may be implemented by the smart charge application 118.

As an illustrative example, if the price difference between a slower charging speed tier (e.g., charging speed tier 2) and a fast charging speed tier (e.g., charging speed tier 4) is twenty cents a minute and falls below the charging price delta threshold of twenty-two cents a minute, the smart charge application 118 may operably control the charging station 112 to adjust the charging speed to charge the EV 102 from the slower charging speed tier (e.g., charging speed tier 2) to the respective fast speed charging speed (e.g., charging speed tier 4).

In one or more embodiments, the charging price delta threshold may be included as a dynamic value that may be manually set by the operator of the EV 102. In particular, the smart charge application 118 may provide a delta threshold user interface that may be utilized by the operator of the EV 102 to manually set and/or adjust the charging price delta threshold. In another embodiment, the charging price delta threshold may be included as a dynamic value that may be automatically set by the smart charge application 118 that may change from one point in time to another. The automatically set dynamic charging price delta may be based on one or more pricing factors that may include, but may not be limited to, a time of day, a season, a region, a time zone, pricing schemes that may be implemented by one or more energy providers at one or more points in time, etc. For example, each hour of a particular day may include a different charging price delta threshold based on one or more pricing schemes that are implemented by the one or more energy providers, one or more charging station entities, and/or one or more charging stations 112. Accordingly, the smart charge application 118 may be configured to compare a price difference between a slower charging speed tier and a fast charging speed tier that may be one or more tiers above the slower charging speed tier against the charging price delta threshold that may be dynamically set during the course of each hour in a given day based on one or more pricing schemes that are implemented by the one or more energy providers.

In an exemplary embodiment, the delta threshold user interface may be also utilized to provide preferences that allow the operator to select a preferred number of charging speed tiers above a default charging speed tier or a slower charging speed tier that are to be evaluated with respect to the charging price difference between the charging speed tiers. For example, the smart charge application 118 may utilize a price difference between a default charging speed tier or slower charging speed tier and a fast charging speed tier that may be more than one tier above a current charging speed tier that does not include a fastest charging speed tier based on the preferred number of charging speed tiers that may be preferred the operator.

In this scenario the preferred number of charging speed tiers that may be preferred by the operator to be analyzed for comparison of pricing may include two or more tiers above the current charging speed tier being utilized to charge the battery 106 of the EV 102. Accordingly, with such a preference, the application 118 may compare a price difference between a default charging speed tier or a slower charging speed tier and a faster charging speed tier that may be two or more tiers above the default charging speed tier or a slower charging speed tier based on the operator's preferences. It is appreciated that the number of tiers to be evaluated for price difference comparison may be increased or decreased based on the operator's preferences and/or based on how many charging speed tiers are available at the charging station(s) 112.

In one or more circumstances, the pricing schemes associated with one or more charging speed tiers may change in real-time as the EV 102 is in the process of being charged at a particular charging speed tier at the charging station(s) 112. In such cases where the cost to charge the EV 102 at the currently utilized charging speed tier that is currently being utilized to charge the battery 106 of the EV 102 changes based on the real-time change in the associated pricing scheme, the smart charge application 118 may be configured to apply the adjusted pricing scheme(s) for the particular charging speed tier that is currently being utilized to charge the battery 106 of the EV 102.

In one embodiment, the smart charge application 118 may be configured to implement the automatic adjustment of the charging speed tier from the currently utilized charging speed tier, that does not include a slowest charging speed tier, to a slower charging speed tier when the increase in the price to charge the battery 106 of the EV 102 from the prior pricing scheme to the current pricing scheme is above the charging price delta threshold. In some configurations, the smart charge application 118 may automatically adjust the currently utilized charging speed tier to a slower charging speed tier that may be associated with a pricing scheme that indicates a change in the price of charging the EV 102 that is equal to or within a range (e.g., within fifteen cents a minute) of the prior pricing scheme which was implemented prior to the pricing scheme change.

In another embodiment, if the cost to charge the EV 102 increases for a currently utilized charging speed tier that is above the slowest charging speed tier and that is currently being utilized to charge the battery 106 of the EV 102 based on a real-time price increase of the associated pricing scheme, the smart charge application 118 may prompt the operator through the pricing scheme user interface to allow the automatic adjustment of the current charging speed to one or more slower charging speed tiers. The smart charge application 118 may also present associated pricing schemes associated with the one or more slower charging speed tiers to allow the operator to determine price points to charge the battery 106 of the EV 102 to a desired SOC.

In one embodiment, if the smart charge application 118 is implementing the automatic charging speed adjustment and the cost to charge the EV 102 for a particular charging speed tier that is below a fastest charging speed tier and that is currently being utilized to charge the battery 106 of the EV 102 decreases such that the decrease in the price to charge the EV 102 above the charging price delta threshold based on a decrease of the associated pricing scheme, the smart charge application 118 may evaluate one or more pricing schemes that may be associated with one or more faster charging speed tiers. In particular, the smart charge application 118 may evaluate the one or more pricing schemes that may be associated with one or faster charging speed tiers to determine if the difference in price to charge the battery 106 of the EV 102 at the one or faster speed tiers is equal to or below the charging price delta threshold. If it is determined that the difference in the price to charge the battery 106 of the EV 102 at the one or more faster charging speed tiers is equal to or below the charging price delta threshold, the smart charge application 118 may automatically adjust the charging speed to a fastest possible charging speed tier that may be associated with a respective pricing scheme.

As an illustrative example, if the pricing scheme associated with a charging speed tier that is currently being utilized to charge the battery 106 of the EV 102 at a respective charging speed decreases, the smart charge application 118 may be configured to evaluate pricing schemes associated with one or more faster charging speed tiers to determine if one or more faster charging speed tiers are associated with respective pricing schemes that provide a price change that is below or equal to the charging price delta threshold. If the automatic adjustment of the charging speed has been actuated by the operator, the smart charge application 118 may automatically select a highest charging speed tier that is associated with a pricing scheme that provides a difference in the price to charge the battery 106 of the EV 102 that is equal to or below the charging price delta threshold. Accordingly, the battery 106 of the EV 102 may be charged to a desired SOC in a shorter period of time than in the current slower charging speed tier.

In another embodiment, if the smart charge application 118 is implementing the automatic charging speed adjustment and the cost to charge the EV 102 decreases based on a decrease in the associated pricing scheme, the application 118 may prompt the operator through the pricing scheme user interface to adjust the current charging speed to one or more faster charging speed tiers. The smart charge application 118 may also present associated pricing schemes that may be associated with the one or faster charging speed tiers to allow the operator to determine price points to charge the battery 106 of the EV 102 to a desired SOC. In some embodiments, the pricing scheme user interface may also present an expected time to charge the battery 106 of the EV 102 to the preferred SOC at one or more respective faster charging speed tiers to allow the operator to evaluate respective charge times. The operator may thereby utilize the pricing scheme user interface to select a particular faster charging speed tier or may select to continue to utilize the current charging speed tier to complete charging of the battery 106.

In one or more embodiments, the smart charge application 118 may be configured to present one or more charging cost incentive user interfaces to the operator of the EV 102 through the display 218 and/or the portable device 222. The one or more charging cost incentive user interfaces may present one or more charging cost incentives to the operator of the EV 102 for purchasing goods and/or services from one or more respective charging station entities and/or additional retailers/service providers. Such charging cost incentives may include the lowering of the charging cost to charge the EV 102 at one or more charging speed tiers.

For example, if the charging station(s) 112 is located near a retail mall, one or more charging station entities may utilize the smart charge application 118 to present one or more charging cost incentives with respect to purchasing a specific value of goods (e.g., fifty dollars) at the retail mall to thereby lower the cost to charge the EV 102 at a fast charging speed tier. Accordingly, the pricing scheme to charge the EV 102 at the fast charging speed tier may be decreased from sixty cents a minute to forty cents a minute based on the implementation of the charging incentive. In some embodiments, the smart charge application 118 may be configured to receive data associated with the operator's retail purchase directly from the station computing infrastructure 116 to thereby implement the charging cost incentive.

Figure 4:
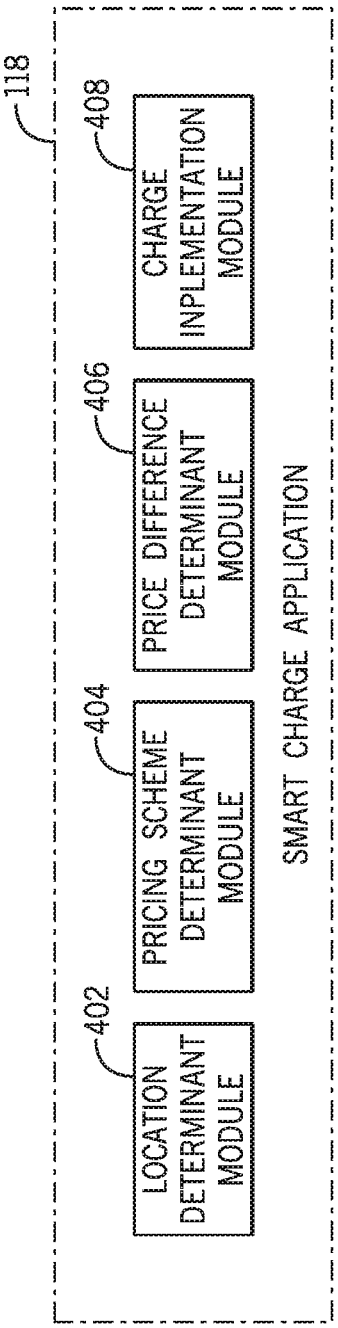
FIG. 4 is a schematic view of a plurality of modules of a smart charge application that may execute computer-implemented instructions for adjusting an electric vehicle charging speed to charge a battery of an electric vehicle (EV) according to an exemplary embodiment of the present disclosure.

FIG. 4 is a schematic view of a plurality of modules 402-408 of the smart charge application 118 that may execute computer-implemented instructions for adjusting an electric vehicle charging speed to charge the battery 106 of the EV 102 according to an exemplary embodiment of the present disclosure. In an exemplary embodiment, the plurality of modules 402-408 may include a location determinant module 402, a pricing scheme determinant module 404, a price difference determinant module 406, and a charge implementation module 408. It is appreciated that the smart charge application 118 may include one or more additional modules and/or sub-modules that are included in addition to or in lieu of the modules 402-408.

Figure 5A:
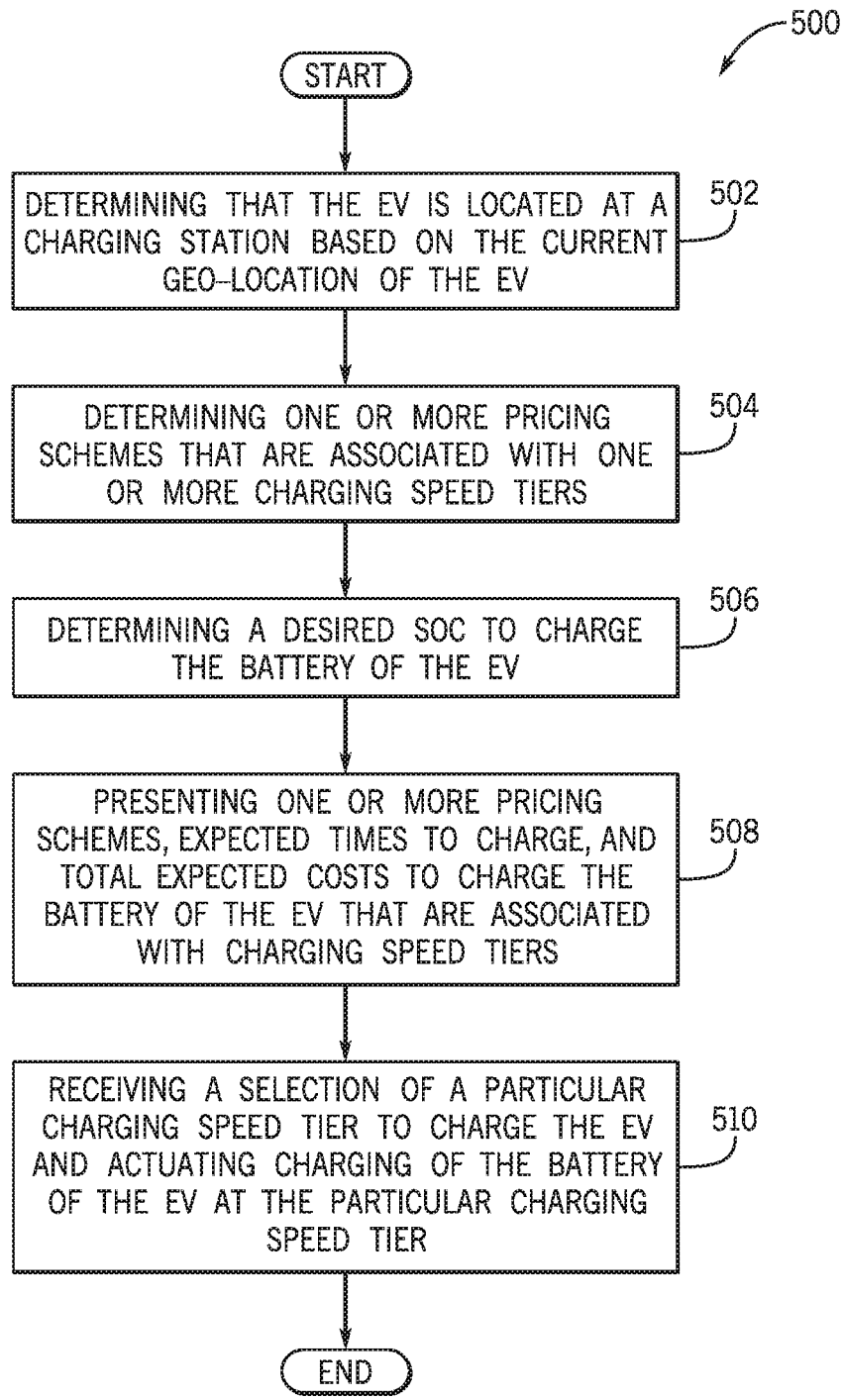
FIG. 5A is a process flow diagram of a method for implementing a manually selected charging speed tier to charge the battery of the EV to a desired SOC according to an exemplary embodiment of the present disclosure.

FIG. 5A is a process flow diagram of a method 500 for implementing a manually selected charging speed tier to charge the battery 106 of the EV 102 to a desired SOC according to an exemplary embodiment of the present disclosure. FIG. 5A will be described with reference to the components of FIG. 1, FIG. 2, FIG. 3, and FIG. 4, through it is to be appreciated that the method 500 of FIG. 5A may be executed and/or used with additional and/or alternative system components. The method 500 may begin at block 502, wherein the method 500 may include determining if the EV 102 is located at a charging station 112 based on the current geo-location of the EV 102.

In an exemplary embodiment, the location determinant module 402 may be configured to communicate with the GPS 210 of the EV 102 to determine the current geo-location of the EV 102 at one or more points in time. As discussed above, the station database 314 stored on the data store 308 of the remote server architecture 300 may include records that may pertain to particular charging stations 112 and their respective geo-locations (GPS/DGPS coordinates of the charging station(s) 112). In one embodiment, the location determinant module 402 may determine if the current geo-location of the EV 102 matches with a respective geo-location of a charging station 112 based on a comparison of the current geo-location of the EV 102 and the geo-locations of charging stations 112 stored upon the station database 314. If the location determinant module 402 determines that the current geo-location of the EV 102 matches with a respective geo-location of a charging station 112, the location determinant module 402 may determine that the EV 102 is located at the particular charging station 112 based on the current geo-location of the EV 102.

The method 500 may proceed to block 504, wherein the method 500 may include determining one or more pricing schemes that are associated with one or more charging speed tiers. In one embodiment, upon determining the particular charging station 112 that the EV 102 may be located at to charge the EV 102 (based on the determination made at block 502), the location determinant module 402 may communicate data pertaining to the particular charging station 112 to the pricing scheme determinant module 404. Such data may include the charging station identification designation that may be used to identify the particular charging station 112.

In an exemplary embodiment, the pricing scheme determinant module 404 may be configured to access the station database 314 and may query the station database 314 based on the charging station identification designation to further access and analyze one or more records of the station database 314 that are associated with the particular charging station 112. In particular, the pricing scheme determinant module 404 may be configured to analyze the records that are associated with the particular charging station 112 that may include one or more price schemes that are associated with one or more charging speed tiers that may be available at the respective charging station 112, as communicated to the remote server 108 by the station computing infrastructure 116.

The records of the station database 314 may be pre-updated and/or updated in real-time by one or more charging station entities based on communication of price data from the station computing infrastructure 116. Upon analyzing the records, the pricing scheme determinant module 404 may determine one or more pricing schemes (e.g., price per kWh) at the current point in time. As discussed, the one or more pricing schemes may include dynamic values that may change over time based on one or more pricing factors that may include, but may not be limited to, a time of day, a season, a region, a time zone, etc. For example, each hour of a particular day may include a different price per kWh based on one or more pricing schemes that are implemented by the one or more energy providers.

The method 500 may proceed to block 506, wherein the method 500 may include determining a desired SOC to charge the battery 106 of the EV 102. In one embodiment, upon determining one or more pricing schemes that are associated with one or more charging speed tiers, the price difference determinant module 406 may be configured to communicate data pertaining to the one or more pricing schemes to the charge implementation module 408 of the smart charge application 118. In one embodiment, the charge implementation module 408 may be configured to present the pricing scheme user interface through the display 218 of the EV 102 or the portable device 222 used by the operator. The pricing scheme user interface may present the pricing schemes that may be associated with the default charging speed tier, one or more slower charging speed tiers, and one or more fast charging speed tiers. The pricing scheme user interface may also include one or more user interface inputs that may enable the operator of the EV 102 to select a desired SOC to charge the battery 106 of the EV 102. The desired SOC may be presented as a percentage value that may be inputted or selected (e.g., using a user interface slider input) with respect to the pricing scheme user interface.

The method 500 may proceed to block 508, wherein the method 500 may include presenting one or more pricing schemes, expected times to charge, and total expected cost to charge the battery 106 of the EV 102 that are associated with charging speed tiers. In an exemplary embodiment, upon determining the desired SOC to charge the battery 106 of the EV 102, the charge implementation module 408 may be configured to present the one or more pricing schemes that are associated with the default charging speed tier and one or more fast charging speed tiers through the pricing scheme user interface.

In one embodiment, the charge implementation module 408 may be configured to communicate with the processor 204 of the vehicle computing device 202 to determine a current SOC of the battery 106 of the EV 102. Upon determining the current SOC of the battery of the EV 102, the charge implementation module 408 may be configured to determine a delta SOC value that is required to charge the battery 106 of the EV 102 from the current SOC to the desired SOC. Stated differently, the delta SOC value may pertain to an amount of charging power that may be required to charge the battery 106 to the desired SOC from the current SOC.

In one or more embodiments, upon determining the delta SOC value, the charge implementation module 408 may be configured to analyze the amount of power that may be supplied to charge the EV 102 at the default charging speed tier, one or more slower charging speed tiers and one or more fast charging speed tiers. The charge implementation module 408 may thereby calculate expected times to charge the battery of the EV 102 to the desired SOC that may be respectively associated with the default charging speed tier, one or more slower charging speed tiers, and one or more fast charging speed tiers. In one embodiment, the charge implementation module 408 may additionally communicate with the price difference determinant module 406 to calculate an estimated total price to charge the EV 102 based on the expected times to charge the battery of the EV 102 to the desired SOC.

The price difference determinant module 406 may calculate the estimated total price to charge the EV 102 at each of the one or more charging speed tiers. The estimated total price to charge the EV 102 may be determined by utilizing the price per kWh value to charge the EV 102 for a respective amount of time that may be calculated to charge the battery 106 of the EV 102 to cover the delta SOC value at each of the pricing schemes that are associated with respective charging speed tiers. The price difference determinant module 406 may thereby communicate respective data associated with the estimated total price to charge the EV 102 to the charge implementation module 408.

In one embodiment, in addition to presenting the one or more pricing schemes that are associated with the default charging speed tier and one or more fast charging speed tiers, the charge implementation module 408 may be configured to additionally present the expected times to charge the battery 106 of the EV 102 to the desired SOC that may be respectively associated with the default charging speed tier and one or more fast charging speed tiers. Additionally, the charge implementation module 408 may be configured to present the estimated total price to charge the battery 106 of the EV 102 to the desired SOC that may be respectively associated with the default charging speed tier and one or more fast charging speed tiers.

The method 500 may proceed to block 510, wherein the method 500 may include receiving a selection of a particular charging speed tier to charge the EV 102 and actuating charging of the battery 106 of the EV 102 at the particular charging speed tier. In one embodiment, the charge implementation module 408 may be configured to provide selection input user interface icons that may be inputted by the operator of the EV 102 to select a particular charging speed tier that may be utilized to charge the EV 102 at the charging station 112. In one configuration, upon receiving a selection of a particular selection input user interface icon associated with the default charging speed tier or a particular fast charging speed tier, the charge implementation module 408 may communicate with the charging station 112 to actuate charging of the battery 106 of the EV 102 at the selected charging speed tier. Accordingly, the charging station 112 may supply a respective amount of charging power that may pertain to the selected charging speed tier to thereby charge the EV 102 at a respective charging speed.

As shown in the illustrated example of FIG. 5B, the pricing scheme user interface 512 may be presented with a listing of the charging speed tiers 514 that may be available at a particular charging station 112. The charging speed tiers 514 may be presented with associated pricing schemes 516 (exemplary pricing not shown in numeric values), associated estimated times to charge the battery 106 of the EV 102 to the desired SOC 518, and a current status 520 of the charging speed tiers 514 with respect to charging of the battery 106 of the EV 102. As shown, the pricing scheme user interface 512 may be configured to include selection input user interface icons 522-534 that may be each be associated with respective charging speed tiers 514 and that may be individually inputted by the operator of the EV 102 to select a particular charging speed tier 514 that may be utilized to charge the EV 102 at the charging station 112.

Figure 6:
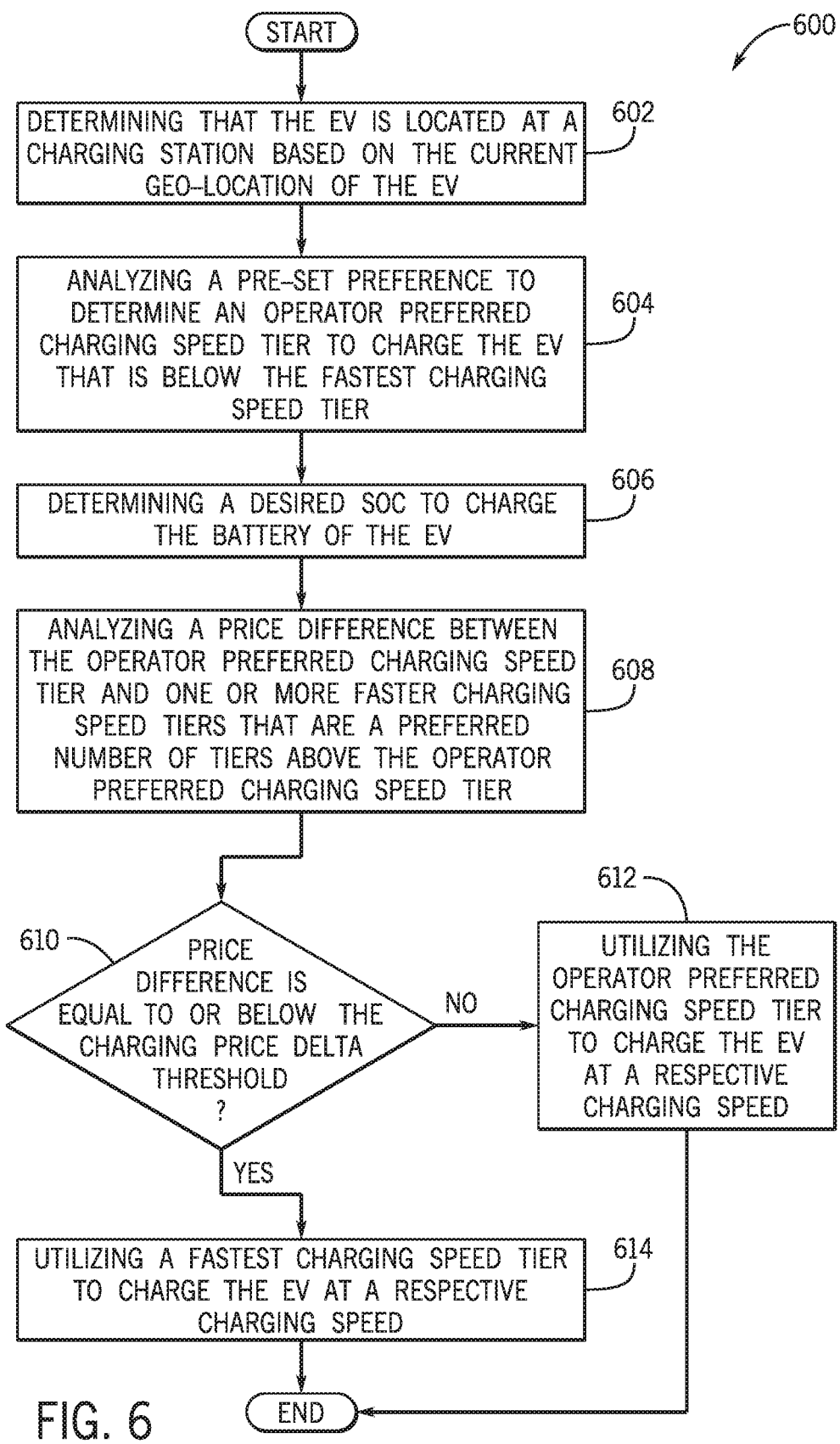
FIG. 6 is a process flow diagram of a method for utilizing a particular charging speed tier to charge the EV based on a difference in pricing schemes according to an exemplary embodiment of the present disclosure.

FIG. 6 is a process flow diagram of a method 600 for utilizing a particular charging speed tier to charge the EV 102 based on a difference in pricing schemes according to an exemplary embodiment of the present disclosure. FIG. 6 will be described with reference to the components of FIG. 1, FIG. 2, FIG. 3, and FIG. 4, through it is to be appreciated that the method 600 of FIG. 6 may be executed and/or used with additional and/or alternative system components. The method 600 may begin at block 602, wherein the method 600 may include determining that the EV 102 is located at a charging station 112 based on the current geo-location of the EV 102.

In an exemplary embodiment, the location determinant module 402 may be configured to communicate with the GPS 210 of the EV 102 to determine the current geo-location of the EV 102 at one or more points in time. In one embodiment, the location determinant module 402 may determine if the current geo-location of the EV 102 matches with a respective geo-location of a charging station 112 based on a comparison of the current geo-location of the EV 102 and the geo-locations of charging stations 112 stored upon the station database 314. If the location determinant module 402 determines that the current geo-location of the EV 102 matches with a respective geo-location of the charging station 112, the location determinant module 402 may determine that the EV 102 is located at the particular charging station 112 based on the current geo-location of the EV 102.

The method 600 may proceed to block 604, wherein the method 600 may include analyzing a pre-set preference to determine an operator preferred charging speed tier to charge the EV 102 that is below the fastest charging speed tier. The smart charge application 118 may allow the operator of the EV 102 to create pre-set preferences with respect to one or more operator preferred charging speed tiers and/or one or more pricing schemes that may pertain to the automatic charging speed selections that may be implemented when it is determined that the EV 102 arrives at one or more charging stations 112. The pre-set preferences may be stored on the operator dataset 224 that is associated with the operator of the EV 102 and stored on the data store 208 of the vehicle computing device 202. The price difference determinant module 406 may be configured to access the operator dataset 224 and retrieve the pre-set preferences associated with one or more operator preferred charging speed tiers and/or one or more pricing schemes that may pertain to the automatic charging speed selections upon determining that the EV 102 is located at the particular charging station 112.

The method 600 may proceed to block 606, wherein the method 600 may include determining a desired SOC to charge the battery 106 of the EV 102. In one embodiment, upon analyzing the pre-set preference to determine an operator preferred charging speed tier to charge the EV 102, the price difference determinant module 406 may be configured to communicate data pertaining to the operator preferred charging speed tier to the charge implementation module 408 of the smart charge application 118.

In one embodiment, the charge implementation module 408 may be configured to present the pricing scheme user interface through the display 218 of the EV 102 or the portable device 222 used by the operator. The pricing scheme user interface may allow the operator of the EV 102 to select a desired SOC to charge the battery 106 of the EV 102. The desired SOC may be provided as a percentage value that may be inputted or selected (e.g., using a user interface slider input) with respect to the pricing scheme user interface. The desired SOC may be communicated to the price difference determinant module 406 and the charge implementation module 408 of the smart charge application 118.

The method 600 may proceed to block 608, wherein the method 600 may include analyzing a price difference between the operator preferred charging speed tier and one or more fast charging speed tiers that are a preferred number of tiers above the operator preferred charging speed tier. In one embodiment, the price difference determinant module 406 may be configured to determine if the operator preferred charging speed tier is a charging speed tier that is below (e.g., not equal to) the fastest charging speed tier that is available at the particular charging station 112 at which the EV 102 is located.

If it is determined that the operator preferred charging speed tier is below the fastest charging speed tier that is available at the particular charging station 112, the price difference determinant module 406 may provide a delta threshold user interface that may be utilized by the operator of the EV 102 to provide preferences that may selected to set a preferred number of tiers that may be analyzed above the operator preferred charging speed tier with respect to a price difference to charge the battery 106 of the EV 102. The preferred number of tiers may include a number of tiers above the operator preferred charging speed tier at which the price to charge the battery 106 of the EV 102 may be further analyzed in comparison to the price to charge the battery 106 of the EV 102 at the operator preferred charging speed tier. Accordingly, the price difference determinant module 406 may analyze a price difference to charge the battery 106 of the EV 102 to the desired SOC between the pricing schemes associated with the operator preferred charging speed tier and one or more fast charging speed tiers that may be a preferred number of tiers above the operator preferred charging speed tier.

In an exemplary embodiment, the price difference determinant module 406 may be configured to communicate with the processor 204 of the vehicle computing device 202 to determine a current SOC of the battery 106 of the EV 102. Upon determining the current SOC of the battery of the EV 102, the price difference determinant module 406 may be configured to determine a delta SOC value that is required to charge the battery 106 of the EV 102 from the current SOC to the desired SOC. Upon determining the delta SOC value, the price difference determinant module 406 may determine the price to charge the EV 102 to the desired SOC from the current SOC based on an amount of charging power that is required to cover the delta SOC value that may be respectively associated with the operator preferred charging speed tier and the one or more fast charging speed tiers that are a preferred number of tiers above the operator preferred charging speed tier.

The method 600 may proceed to block 610, wherein the method 600 may include determining if a price difference between the operator preferred charging speed tier and one or more charging speed tiers that are a preferred number of tiers above the operator preferred charging speed tier is equal to or below the charging price delta threshold. In one embodiment, the charging price delta threshold may be included as a dynamic value that may be automatically set by the price difference determinant module 406 of the smart charge application 118 that may change from one point in time to another. The automatically set dynamic charging price delta may be based on one or more pricing factors that may include, but may not be limited to, a time of day, a season, a region, a time zone, pricing schemes that may be implemented by one or more energy providers at one or more points in time, etc. In another embodiment, the charging price delta threshold may be included as a dynamic value that may be manually set by the operator of the EV 102 through the delta threshold user interface that may be utilized by the operator of the EV 102 to manually set and/or adjust the charging price delta threshold.

In an exemplary embodiment, the price difference determinant module 406 may be configured to compare the price to charge the EV 102 to the desired SOC from the current SOC based on an amount of charging power that is required to cover the delta SOC value that may be respectively associated with the operator preferred charging speed tier and the one or more fast charging speed tiers that are a preferred number of tiers above the operator preferred charging speed tier. In particular, the price difference determinant module 406 may be configured to compare the difference between the price to charge the EV 102 to the desired SOC from the current SOC based on an amount of charging power that is required to cover the delta SOC value that may be respectively associated with the operator preferred charging speed tier and the one or more charging speed tiers that are a preferred number of tiers above the operator preferred charging speed tier. The difference between the price to charge between the two or more charging speed tiers may be compared against the charging price delta threshold to determine if the difference between the operator preferred charging speed tier and each charging speed tier that is the preferred number of tiers above the operator preferred charging speed tier is equal to or below the charging price delta threshold.

Referring again to FIG. 5B, as an illustrative example, if the price difference determinant module 406 determines that the operator has set a preferred number of tiers to two or more tiers to be evaluated for a price difference to charge the battery 106 of the EV 102 with respect to the operator preferred charging speed tier, the price difference determinant module 406 may accordingly analyze a price difference between the default charging speed tier that is set by the operator as the operator preferred charging speed tier and one or more fast charging speed tiers that may be at least two tiers above the preferred charging speed tier.

Accordingly, the price difference determinant module 406 may analyze a price difference to charge the battery 106 of the EV 102 to the desired SOC between the pricing schemes associated with the operator preferred charging speed tier and the pricing schemes associated with fast tier 3, fast tier 2, and the fastest tier 1 (that are charging speed tiers that are at least two or more tiers above the preferred charging speed tier). Upon determining the delta SOC value of the battery 106 of the EV 102, the price difference determinant module 406 may determine the price to charge the battery 106 of the EV 102 to the desired SOC from the current SOC based on an amount of charging power that is required to cover the delta SOC value that may be respectively associated with the operator preferred charging speed tier and the aforementioned fast tiers 3, 2, and 1 that are at least two tires above the operator preferred charging speed tier.

Referring again to FIG. 6, in one embodiment, if it is determined that the price difference between price to charge between the operator preferred charging speed tier and one or more charging speed tiers that are a preferred number of tiers above the operator preferred charging speed tier is above the charging price delta threshold (at block 610), the method 600 may proceed to block 612, wherein the method 600 may include utilizing the operator preferred charging speed tier to charge the EV 102 at a respective charging speed. In an exemplary embodiment, if it is determined that the difference in the price to charge the battery 106 of the EV 102 to the desired SOC is above the charging price delta threshold, the price difference determinant module 406 may communicate respective data to the charge implementation module 408. The charge implementation module 408 may thereby be configured to communicate with the charging station 112 to actuate charging of the battery 106 of the EV 102 at the operator preferred charging speed tier and associated pricing scheme. Accordingly, the charging station 112 may supply a respective amount of charging power that may pertain to the operator preferred charging speed tier.

With respect to the aforementioned illustrative example illustrated in FIG. 5B, if it is determined that the price difference between the price to charge between the operator preferred charging speed tier and fast tier 3, fast tier 2, and/or the fastest tier 1 (that are at least two tiers above the operator preferred charging speed tier) is above the charging price delta threshold of $0.20 per kilowatt-hour of energy value, the price difference determinant module 406 may communicate respective data to the charge implementation module 408. The charge implementation module 408 may thereby be configured to communicate with the charging station 112 to actuate charging of the battery 106 of the EV 102 at the operator preferred charging speed tier and associated pricing scheme. Accordingly, the charging station 112 may supply a respective amount of charging power that may pertain to the operator preferred charging speed tier.

With continued reference to FIG. 6, in one embodiment, if it is determined that the price difference between price to charge between the operator preferred charging speed tier and one or more charging speed tiers that are a preferred number of tiers above the operator preferred charging speed tier is equal to or below the charging price delta threshold (at block 610), the method 600 may proceed to block 614 wherein the method 600 may include utilizing a fastest charging speed tier to charge the EV 102 at a respective charging speed. In an exemplary embodiment, if it is determined that the difference in the price to charge the battery 106 of the EV 102 to the desired SOC is equal to or below the charging price delta threshold, the price difference determinant module 406 may communicate respective data to the charge implementation module 408.

The charge implementation module 408 may thereby be configured to determine a fastest charging speed tier that includes a price to charge the battery 106 of the EV 102 to the desired SOC (based on the associated pricing scheme) that includes a price difference from the operator preferred charging speed tier that is equal to or below the charging price delta threshold. The charge implementation module 408 may thereby communicate with the charging station 112 to actuate charging of the battery 106 of the EV 102 at the fastest charging speed tier to charge the EV 102 at a respective charging speed that is a preferred number of tiers above the operator preferred charging speed tier using the associated pricing scheme. Accordingly, the charging station 112 may supply a respective amount of charging power that may pertain to the fastest charging speed tier to charge the EV 102 at a respective charging speed that is a preferred number of tiers above the operator preferred charging speed.

With reference again to FIG. 5B, and the aforementioned illustrative example, if it is determined that the price difference between the price to charge between the operator preferred charging speed tier and fast tier 1 is above the charging price delta threshold of $0.20 per kilowatt-hour of energy value, the charge implementation module 408 may not adjust the charging speed tier to the fastest tier 1. However, if it is determined that the price difference between the price to charge between the operator preferred charging speed tier and fast tier 3 and price to charge between the operator preferred charging speed tier and fast tier 2 are both equal to or below the charging price delta threshold of $0.20 dollars per kilowatt-hour of energy value, the price difference determinant module the charge implementation module 408 may be configured to communicate with the charging station 112 to actuate charging of the battery 106 of the EV 102 at the fastest charging speed tier of fast tier 2. In other words, the charge implementation module 408 may utilize the fast tier 2 charging speed tier since it is the fastest charging speed tier that includes a price to charge the battery 106 of the EV 102 to the desired SOC that includes a price difference from the operator preferred charging speed tier that is equal to or below the charging price delta threshold). Accordingly, the charging station 112 may supply a respective amount of charging power that may pertain to the fastest charging speed tier (e.g., fast tier 2) based on the difference in the price to charge the battery 106 of the EV 102 being equal to or below the charging price delta threshold of $0.20 dollars per kilowatt-hour of energy value.

Figure 7:
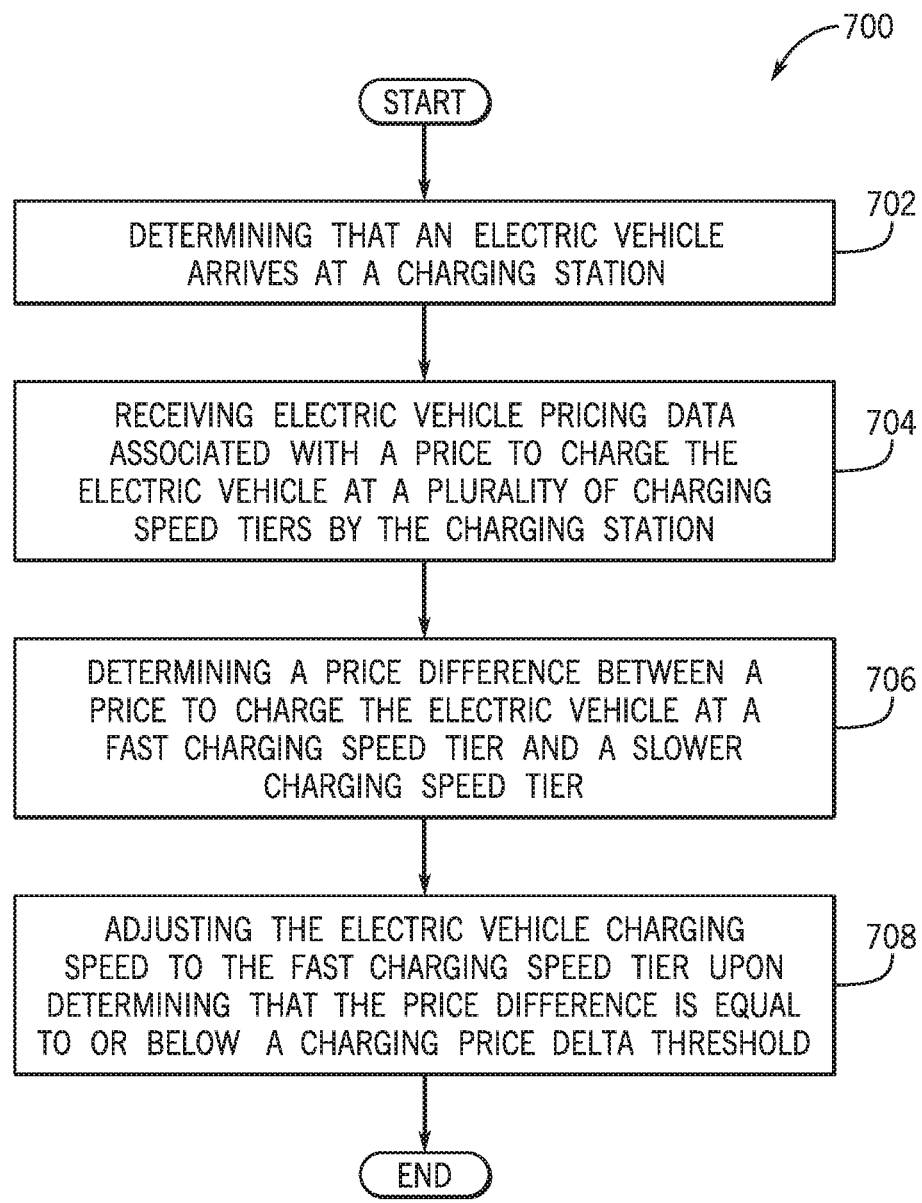
FIG. 7 is a process flow diagram of a method for adjusting an electric vehicle charging speed according to an exemplary embodiment of the present disclosure.

FIG. 7 is a process flow diagram of a method 700 for adjusting an electric vehicle charging speed according to an exemplary embodiment of the present disclosure. FIG. 7 will be described with reference to the components of FIG. 1, FIG. 2, FIG. 3, and FIG. 4, through it is to be appreciated that the method 700 of FIG. 7 may be executed and/or used with additional and/or alternative system components. The method 700 may begin at block 702, wherein the method 700 may include determining that an electric vehicle 102 arrives at a charging station 112.

The method 700 may proceed to block 704, wherein the method 700 may include receiving electric vehicle pricing data associated with a price to charge the electric vehicle at a plurality of charging speed tiers by the charging station 112. The method 700 may proceed to block 706, wherein the method 700 may include determining a price difference between the price to charge the electric vehicle at a fast charging speed tier and a slower charging speed tier. In one embodiment, the charging speed to charge the electric vehicle 102 is faster when utilizing the fast charging speed tier than when utilizing the slower charging speed tier. The method 700 may proceed to block 708, wherein the method 700 may include adjusting the electric vehicle charging speed to the fast charging speed tier upon determining that the price difference is equal to or below a charging price delta threshold.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for adjusting an electric vehicle charging speed comprising:
    determining that an electric vehicle arrives at a charging station;
    receiving electric vehicle pricing data associated with a price to charge the electric vehicle at a plurality of charging speed tiers by the charging station;
    determining a price difference between the price to charge the electric vehicle at a fast charging speed tier and a slower charging speed tier, wherein the charging speed to charge the electric vehicle is faster when utilizing the fast charging speed tier than when utilizing the slower charging speed tier; and
    adjusting the electric vehicle charging speed to the fast charging speed tier upon determining that the price difference is equal to or below a charging price delta threshold.

2. The computer-implemented method of claim 1, wherein determining that the electric vehicle arrives at the charging station includes querying a station database to determine if a current geo-location of the electric vehicle matches with a geo-location of the charging station stored on the station database.

3. The computer-implemented method of claim 2, wherein receiving electric vehicle pricing data includes querying the station database and determining a plurality of pricing schemes that are respectively associated with the plurality of charging speed tiers that are available at the charging station at a current point in time.

4. The computer-implemented method of claim 3, further including determining an operator preferred charging speed tier of the plurality of charging speed tiers that is preferred by an operator of the electric vehicle as an automatic charging speed selection when the electric vehicle arrives at the charging station, wherein the operator preferred charging speed tier does not include a fastest charging speed tier that is available to charge the electric vehicle at the charging station.

5. The computer-implemented method of claim 4, wherein determining the price difference includes providing a delta threshold user interface that is utilized by the operator of the electric vehicle to select a preferred number of tiers above the operator preferred charging speed tier at which the price to charge the electric vehicle is to be analyzed in comparison to the price to charge the electric vehicle at the operator preferred charging speed tier.

6. The computer-implemented method of claim 5, wherein determining the price difference includes determining a price to charge a battery of the electric vehicle to a desired state of charge level from a current state of charge level for the operator preferred charging speed tier and at least one fast charging speed tier that is the preferred number of tiers above the operator preferred charging speed tier.

7. The computer-implemented method of claim 6, wherein adjusting the electric vehicle charging speed includes determining if the price difference to charge the battery of the electric vehicle to the desired state of charge level from the current state of charge level for the operator preferred charging speed tier and the at least one fast charging speed tier that is the preferred number of tiers above the operator preferred charging speed tier is equal to or below the charging price delta threshold.

8. The computer-implemented method of claim 7, wherein adjusting the electric vehicle charging speed includes adjusting the electric vehicle charging speed to the at least one fast charging speed tier that is the preferred number of tiers above the operator preferred charging speed tier if the price difference to charge the battery of the electric vehicle to the desired state of charge level for the operator preferred charging speed tier and the at least one fast charging speed tier is equal to or below the charging price delta threshold.

9. The computer-implemented method of claim 7, wherein adjusting the electric vehicle charging speed to the fast charging speed tier includes adjusting the electric vehicle charging speed to the fastest charging speed tier that is available at the charging station that is associated with a pricing scheme that provides a price difference from the operator preferred charging speed tier that is equal to or below the charging price delta threshold.

10. A system for adjusting an electric vehicle charging speed comprising:
    a memory storing instructions when executed by a processor cause the processor to:
    determine that an electric vehicle arrives at a charging station;
    receive electric vehicle pricing data associated with a price to charge the electric vehicle at a plurality of charging speed tiers by the charging station;
    determine a price difference between the price to charge the electric vehicle at a fast charging speed tier and a slower charging speed tier, wherein the charging speed to charge the electric vehicle is faster when utilizing the fast charging speed tier than when utilizing the slower charging speed tier; and
    adjust the electric vehicle charging speed to the fast charging speed tier upon determining that the price difference is equal to or below a charging price delta threshold.

11. The system of claim 10, wherein determining that the electric vehicle arrives at the charging station includes querying a station database to determine if a current geo-location of the electric vehicle matches with a geo-location of the charging station stored on the station database.

12. The system of claim 11, wherein receiving electric vehicle pricing data includes querying the station database and determining a plurality of pricing schemes that are respectively associated with the plurality of charging speed tiers that are available at the charging station at a current point in time.

13. The system of claim 12, further including determining an operator preferred charging speed tier of the plurality of charging speed tiers that is preferred by an operator of the electric vehicle as an automatic charging speed selection when the electric vehicle arrives at the charging station, wherein the operator preferred charging speed tier does not include a fastest charging speed tier that is available to charge the electric vehicle at the charging station.

14. The system of claim 13, wherein determining the price difference includes providing a delta threshold user interface that is utilized by the operator of the electric vehicle to select a preferred number of tiers above the operator preferred charging speed tier at which the price to charge the electric vehicle is to be analyzed in comparison to the price to charge the electric vehicle at the operator preferred charging speed tier.

15. The system of claim 14, wherein determining the price difference includes determining a price to charge a battery of the electric vehicle to a desired state of charge level from a current state of charge level for the operator preferred charging speed tier and at least one fast charging speed tier that is the preferred number of tiers above the operator preferred charging speed tier.

16. The system of claim 15, wherein adjusting the electric vehicle charging speed includes determining if the price difference to charge the battery of the electric vehicle to the desired state of charge level from the current state of charge level for the operator preferred charging speed tier and the at least one fast charging speed tier that is the preferred number of tiers above the operator preferred charging speed tier is equal to or below the charging price delta threshold.

17. The system of claim 16, wherein adjusting the electric vehicle charging speed includes adjusting the electric vehicle charging speed to the at least one fast charging speed tier that is the preferred number of tiers above the operator preferred charging speed tier if the price difference to charge the battery of the electric vehicle to the desired state of charge level for the operator preferred charging speed tier and the at least one fast charging speed tier is equal to or below the charging price delta threshold.

18. The system of claim 16, wherein adjusting the electric vehicle charging speed to the fast charging speed tier includes adjusting the electric vehicle charging speed to the fastest charging speed tier that is available at the charging station that is associated with a pricing scheme that provides a price difference from the operator preferred charging speed tier that is equal to or below the charging price delta threshold.

19. A non-transitory computer readable storage medium storing instructions that when executed by a computer, which includes a processor perform a method, the method comprising:
    determining that an electric vehicle arrives at a charging station;
    receiving electric vehicle pricing data associated with a price to charge the electric vehicle at a plurality of charging speed tiers by the charging station;
    determining a price difference between the price to charge the electric vehicle at a fast charging speed tier and a slower charging speed tier, wherein the charging speed to charge the electric vehicle is faster when utilizing the fast charging speed tier than when utilizing the slower charging speed tier; and
    adjusting the electric vehicle charging speed to the fast charging speed tier upon determining that the price difference is equal to or below a charging price delta threshold.

20. The non-transitory computer readable storage medium of claim 19, wherein adjusting the electric vehicle charging speed includes determining if the price difference to charge the battery of the electric vehicle to a desired state of charge level from a current state of charge level for an operator preferred charging speed tier and at least one fast charging speed tier that is a preferred number of tiers above the operator preferred charging speed tier is equal to or below the charging price delta threshold.

* * * * *